United States Patent
Valencia Lopez

(10) Patent No.: US 9,973,578 B2
(45) Date of Patent: May 15, 2018

(54) REAL TIME CACHING EFFICIENT CHECK IN A CONTENT CENTRIC NETWORKING (CCN)

(71) Applicant: Telefonaktiebolaget L M Ericsson (publ), Stockholm (SE)

(72) Inventor: Carlos Valencia Lopez, Leganes (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 324 days.

(21) Appl. No.: 14/727,772

(22) Filed: Jun. 1, 2015

(65) Prior Publication Data
US 2016/0352604 A1     Dec. 1, 2016

(51) Int. Cl.
G06F 15/16 (2006.01)
H04L 29/08 (2006.01)
H04L 12/24 (2006.01)

(52) U.S. Cl.
CPC ........ H04L 67/1097 (2013.01); H04L 41/509 (2013.01); H04L 41/5035 (2013.01); H04L 67/2842 (2013.01)

(58) Field of Classification Search
USPC .......................................................... 709/217
See application file for complete search history.

(56) References Cited

U.S. PATENT DOCUMENTS

| | | | | |
|---|---|---|---|---|
| 6,721,269 B2* | 4/2004 | Cao | ............ | H04J 3/14 370/227 |
| 7,127,180 B1* | 10/2006 | Khera | ............ | H04L 12/56 370/254 |
| 7,773,878 B2* | 8/2010 | Khera | ............ | H04L 12/56 370/351 |
| 8,149,692 B2* | 4/2012 | Holness | ............ | H04L 45/28 370/222 |
| 8,548,325 B2* | 10/2013 | Khera | ............ | H04L 12/56 370/351 |
| 8,750,095 B2* | 6/2014 | Bashandy | ............ | H04L 41/0663 370/218 |
| 8,762,477 B2* | 6/2014 | Xie | ............ | H04L 67/327 709/213 |

(Continued)

OTHER PUBLICATIONS

Mosko, "CCNx 1.0 Protocol Specification Roadmap," Palo Alto Research Center, Inc., (Apr. 14, 2014), 105 pages.

(Continued)

Primary Examiner — Alicia Baturay
(74) Attorney, Agent, or Firm — NDWE, LLP

(57) ABSTRACT

A method for monitoring cache efficiency by a network device is implemented in a content centric networking (CCN) gateway or CCN router, where the CCN gateway or CCN router is part of a CCN network. The method collects content object retrieval information using a cache check type length value (TLV) that tracks a number of hops between a CCN gateway and a node in the CCN network that caches the content object. The method includes receiving a CCN interest packet from a user equipment, the CCN interest packet including a content object name, determining whether the cache check TLV is present in the CCN interest packet, and updating a value of the cache check TLV where the cache check TLV is determined to be present in the CCN interest packet.

24 Claims, 10 Drawing Sheets

(56) References Cited

U.S. PATENT DOCUMENTS

| | | | | |
|---|---|---|---|---|
| 8,891,541 | B2* | 11/2014 | Calo | H04L 45/38 370/230 |
| 9,019,971 | B2* | 4/2015 | Calo | H04L 45/38 370/401 |
| 9,225,592 | B2* | 12/2015 | Bashandy | H04L 41/0663 |
| 9,270,598 | B1* | 2/2016 | Oran | H04L 67/327 |
| 9,276,922 | B2* | 3/2016 | Mosko | H04L 63/08 |
| 9,465,641 | B2* | 10/2016 | Ryu | G06F 9/45558 |
| 9,473,404 | B2* | 10/2016 | Anand | H04L 45/38 |
| 9,473,405 | B2* | 10/2016 | Mosko | H04L 45/7453 |
| 9,544,162 | B2* | 1/2017 | Vasseur | H04L 12/1895 |
| 9,552,493 | B2* | 1/2017 | Uzun | G06F 21/6227 |
| 9,553,806 | B2* | 1/2017 | Anand | H04L 45/00 |
| 9,577,949 | B2* | 2/2017 | Oran | H04L 47/722 |
| 9,712,649 | B2* | 7/2017 | Lopez | H04L 69/166 |
| 2006/0090068 | A1* | 4/2006 | Andersen | H04L 12/14 713/160 |
| 2014/0189060 | A1* | 7/2014 | Westphal | H04W 36/0016 709/217 |
| 2015/0092529 | A1* | 4/2015 | Vasseur | H04L 12/1895 370/216 |
| 2015/0117459 | A1* | 4/2015 | Liu | H04L 45/742 370/392 |
| 2015/0229550 | A1* | 8/2015 | Addeo | H04L 43/10 709/224 |
| 2016/0019110 | A1* | 1/2016 | Mosko | G06F 11/0784 714/57 |
| 2016/0021170 | A1* | 1/2016 | Mosko | G06F 17/3089 709/217 |
| 2016/0065677 | A1* | 3/2016 | Mosko | H04L 29/12 709/228 |
| 2016/0105394 | A1* | 4/2016 | Rangarajan | H04L 61/302 709/223 |
| 2016/0164952 | A1* | 6/2016 | Tur Nyi | H04L 67/10 709/219 |
| 2016/0212066 | A1* | 7/2016 | Ravindran | H04L 47/80 |
| 2016/0212277 | A1* | 7/2016 | Lopez | H04M 15/835 |
| 2016/0234333 | A1* | 8/2016 | Yeh | H04L 45/586 |

OTHER PUBLICATIONS

Rossi, et al, "Caching performance of content centric networks under multi-path routing (and more)," Technical Report, Telecom ParisTech, 2011, downloaded from <http://www.enst.fr/~drossi/paper/rossi11ccn-techrep1.pdf> on Sep. 11, 2017, 9 pages.

* cited by examiner

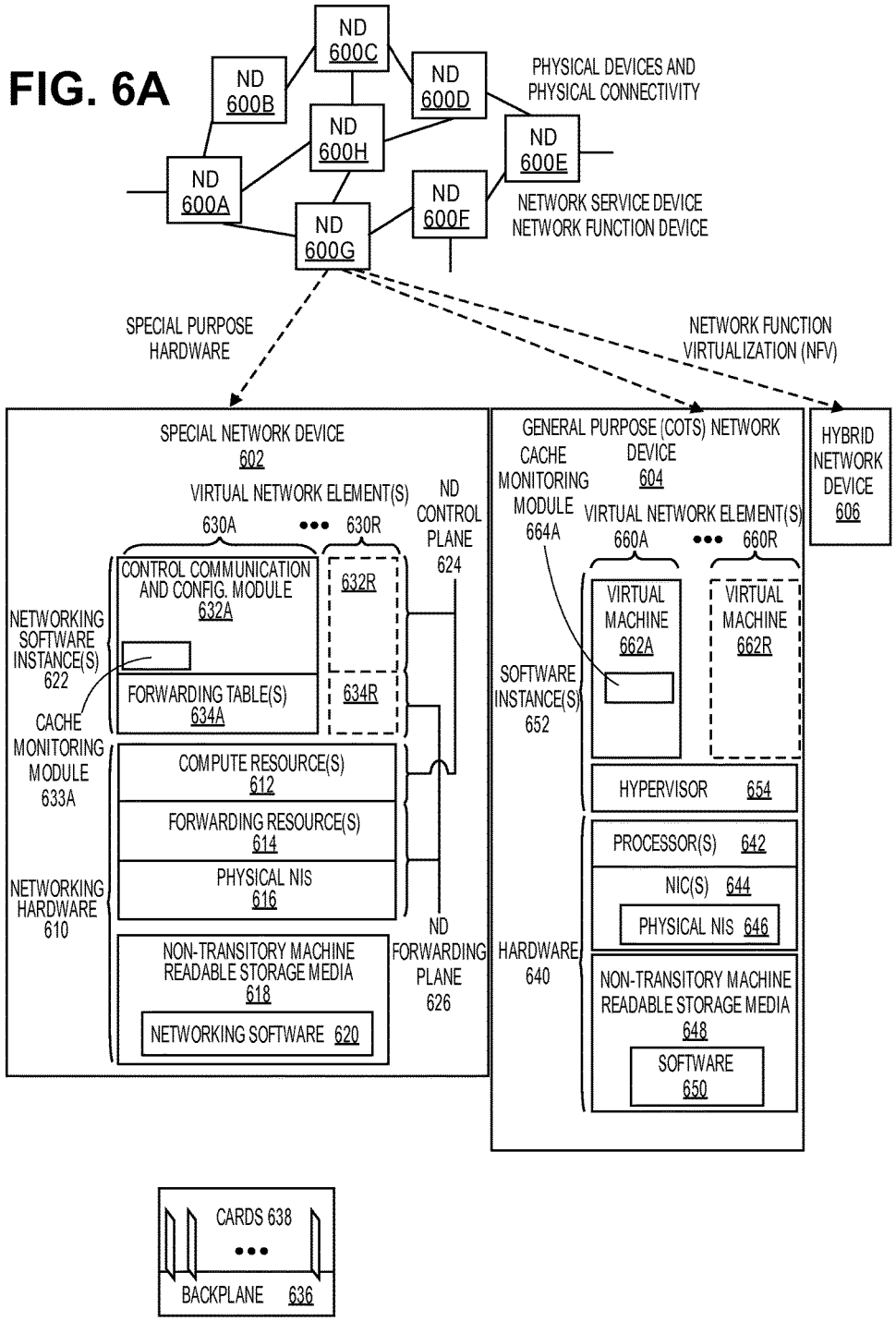

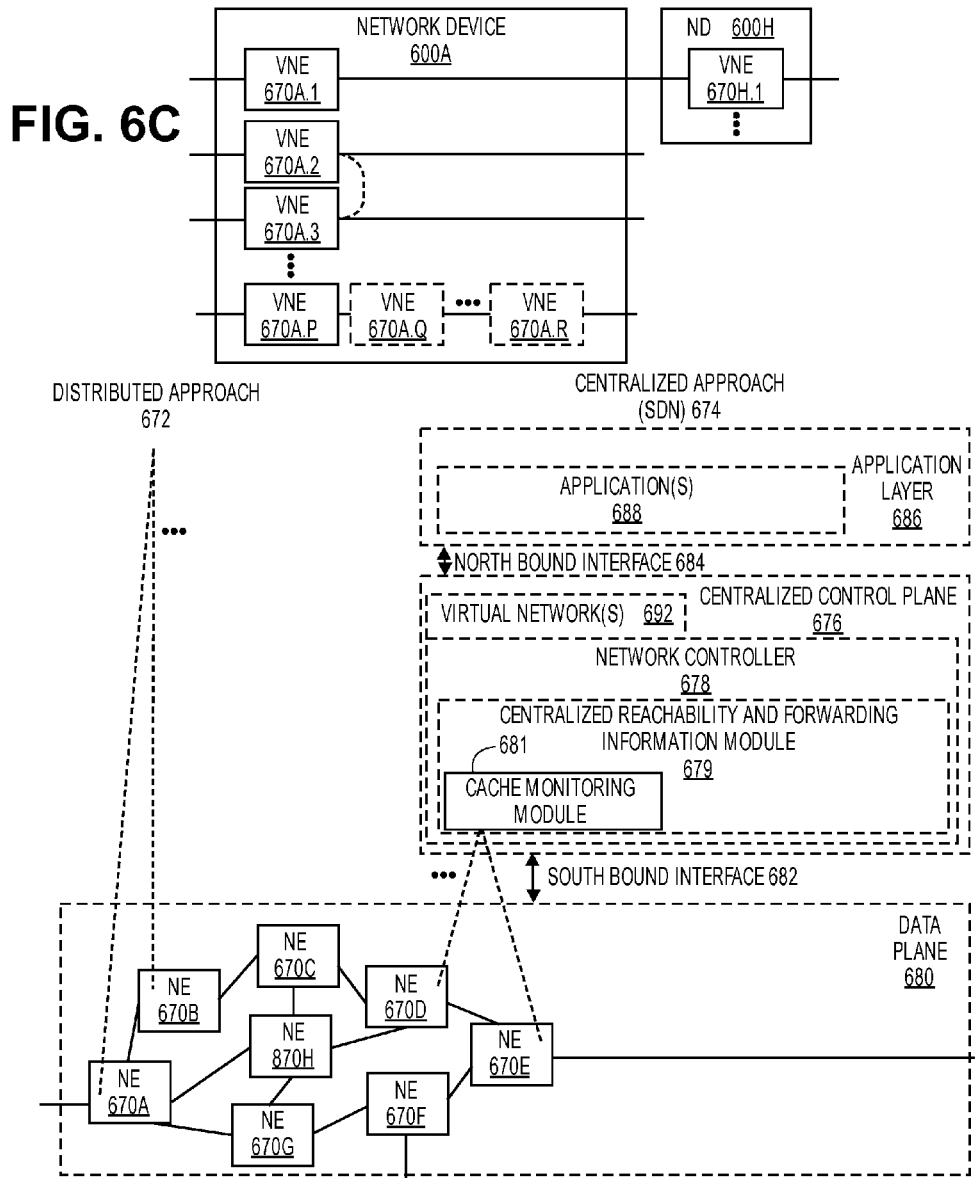
FIG. 6C
FIG. 6D
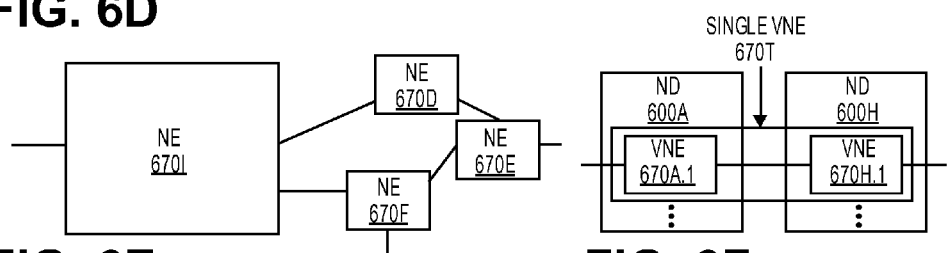
FIG. 6E
FIG. 6F

REAL TIME CACHING EFFICIENT CHECK IN A CONTENT CENTRIC NETWORKING (CCN)

FIELD

Embodiments of the invention relate to a process for determining real time caching efficiency in information centric networking (ICN) networks such as content centric networking (CCN) networks. Specifically, the embodiments relate to a method and system implemented by a content centric networking (CCN) gateway and the CCN routers to track the number of nodes in the network that were traversed to find a requested content object. This information can be analyzed to determine the efficiency of caching in the ICN network.

BACKGROUND

An ICN network is a conceptualization of a networking protocol stack, in particular layers 3 and above of a network protocol stack. The CCN network as well as similar networks like named data networking (NDN) networks are particular architectures and implementations of an ICN network. ICN, CCN, and NDN networks are based on the premise of naming resources in these networks. In particular, the naming relates to the use of a globally shared namespace for objects that allows entities in these networks to retrieve any content of interest. NDN networks and CCN networks have similar architectures, and for sake of clarity, examples related to CCN networks are discussed herein below.

Thus, within a CCN network, a name is utilized to identify a content object instead of an Internet Protocol (IP) address of the host of the content. In an IP network, routing is based on host names (e.g., source and destination addresses). In a CCN network by contrast, routing is based on a uniform resource identifier (URI) or similar identifier for a content object. CCN routing is performed hop-by-hop, using longest prefix matching on the content object name. All communications seeking to access data are framed as a request and response transaction. A CCN client (e.g., executed by user equipment) sends a message referred to as a CCN interest packet to the nodes in the CCN network. The nodes of the CCN network respond with a content object identified by the content object name in the CCN interest. These content objects are returned via a CCN response.

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN node receives a CCN interest packet, the CCN node can check whether its local content store has the requested content object and, if so, can send the content object to the requesting CCN client. The look up in the content store is by the content object name. If the content object name is not found in the local content store, then the CCN interest is forwarded according to entries for the content object name in a forwarding information base (FIB) of the CCN node.

SUMMARY

In one embodiment, a method for monitoring cache efficiency by a network device is implemented in a content centric networking (CCN) gateway or CCN router, where the CCN gateway or CCN router is part of a CCN network. The method collects content object retrieval information using a cache check type length value (TLV) that tracks a number of hops between a CCN gateway and a node in the CCN network that caches the content object. The method includes receiving a CCN interest packet from a user equipment, the CCN interest packet including a content object name, determining whether the cache check TLV is present in the CCN interest packet, and updating a value of the cache check TLV where the cache check TLV is determined to be present in the CCN interest packet.

In one embodiment, a network device to implement a method for monitoring cache efficiency by a network device is implemented in a content centric networking (CCN) gateway or CCN router. The network device functions as a CCN gateway or CCN router that is part of a CCN network. The method collects content object retrieval information using a cache check type length value (TLV) that tracks a number of hops between a CCN gateway and a node in the CCN network that caches the content object. The network device includes a non-transitory computer-readable medium having stored therein a cache monitoring module, and a processor coupled to the non-transitory computer-readable medium. The processor is configured to execute the cache monitoring module, the cache monitoring module configured to access a CCN interest packet received from a user equipment, the CCN interest packet including a content object name, to determine whether the cache check TLV is present in the CCN interest packet, and to update a value of the cache check TLV where the cache check TLV is determined to be present in the CCN interest packet.

In one embodiment, a computing device is configured to execute a plurality of virtual machines for implementing network function virtualization (NFV), wherein a virtual machine from the plurality of virtual machines is configured to implement a method for monitoring cache efficiency by the computing device implementing a content centric networking (CCN) gateway or CCN router, where the CCN gateway or CCN router is part of a CCN network. The method collects content object retrieval information using a cache check type length value (TLV) that tracks a number of hops between a CCN gateway and a node in the CCN network that caches the content object. The computing device includes a non-transitory computer-readable medium having stored therein a cache monitoring module, and a processor coupled to the non-transitory computer-readable medium. The processor is configured to execute the virtual machine. The virtual machine is configured to execute the cache monitoring module. The cache monitoring module is configured to access a CCN interest packet received from a user equipment, where the CCN interest packet includes a content object name, to determine whether a cache check TLV is present in the CCN interest packet, and to update a value of the cache check TLV where the cache check TLV is determined to be present in the CCN interest packet.

In a further embodiment, a control plane device is configured to implement a control plane of a software defined networking (SDN) network including a plurality of network devices forming a content centric networking (CCN) network. The control plane device implements a method for monitoring cache efficiency. The method collects content object retrieval information using a cache check type length value (TLV) that tracks a number of hops between a CCN gateway and a node in the CCN network that caches the content object. The control plane device includes a non-transitory computer-readable medium having stored therein a cache monitoring module, and a processor coupled to the non-transitory computer-readable medium. The processor is configured to execute the cache monitoring module. The cache monitoring module is configured to access a CCN interest packet received from a user equipment, where the CCN interest packet includes a content object name, to determine whether a cache check TLV is present in the CCN interest packet, and to update a value of the cache check TLV where the cache check TLV is determined to be present in the CCN interest packet.

BRIEF DESCRIPTION OF THE DRAWINGS

The invention may best be understood by referring to the following description and accompanying drawings that are used to illustrate embodiments of the invention. In the drawings:

FIG. 6A illustrates connectivity between network devices (NDs) within an exemplary network, as well as three exemplary implementations of the NDs, according to some embodiments of the invention.

FIG. 6B illustrates an exemplary way to implement the special-purpose network device according to some embodiments of the invention.

FIG. 6C illustrates various exemplary ways in which virtual network elements (VNEs) may be coupled according to some embodiments of the invention.

FIG. 6D illustrates a network with a single network element (NE) on each of the NDs of FIG. 6A.

FIG. 6E illustrates an example where each of the NDs implements a single NE (see FIG. 6D), but the centralized control plane has abstracted multiple of the NEs in different NDs into a single NE in one of the virtual network(s) of FIG. 6D, according to some embodiments of the invention.

FIG. 6F illustrates a case where multiple VNEs are implemented on different NDs and are coupled to each other, and where the centralized control plane has abstracted these multiple VNEs such that they appear as a single VNE within one of the virtual networks of FIG. 6, according to some embodiments of the invention.

DETAILED DESCRIPTION

Figure 1:
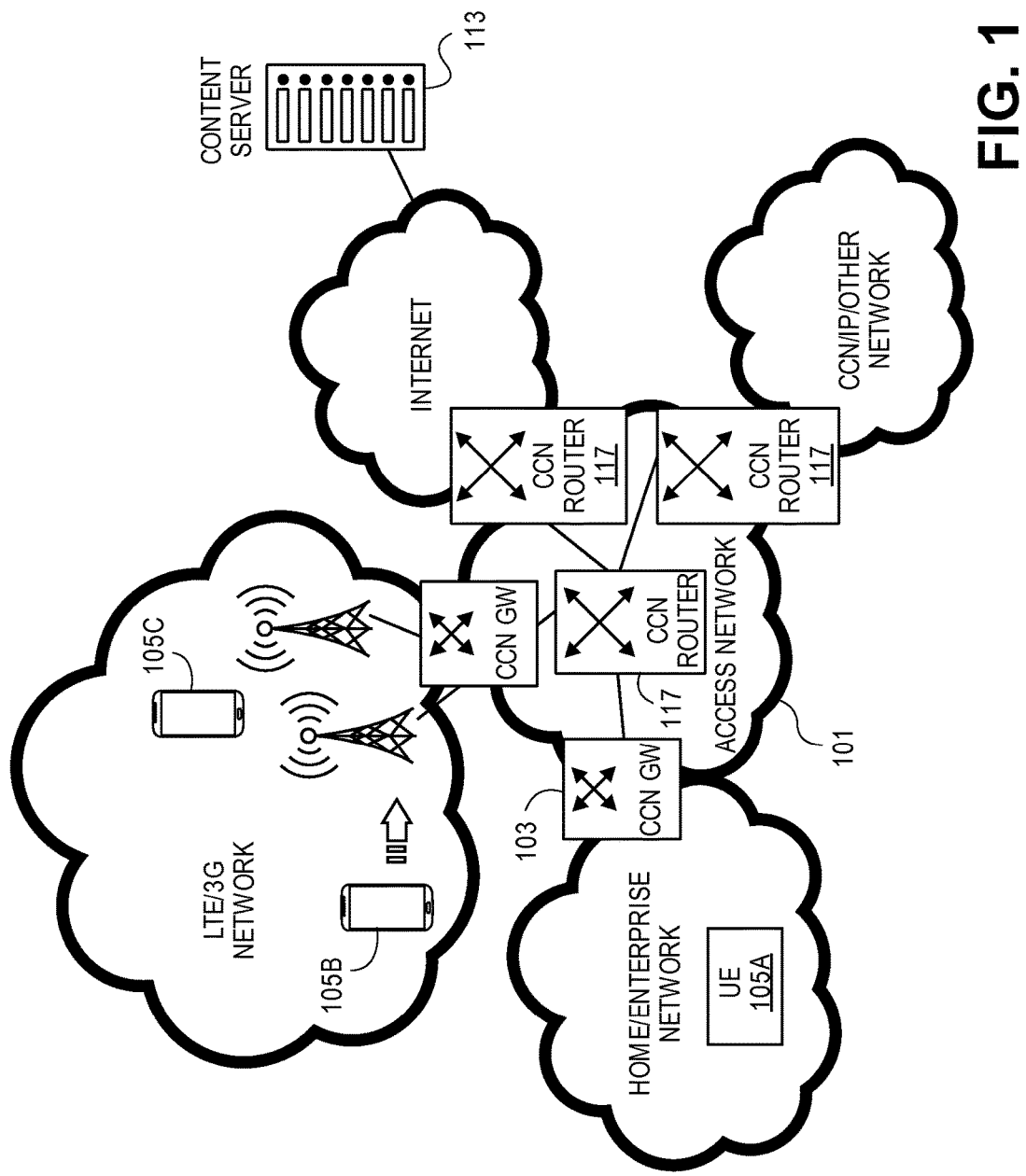
FIG. 1 is a diagram of one embodiment of a CCN network including placement of CCN gateways, CCN routers and content servers in the CCN network.

The following description describes methods and apparatus for implementing cache efficiency monitoring at a content centric networking (CCN) gateway and at CCN nodes in a CCN network. In these embodiments, the CCN gateway can add a cache check type length value (TLV) to CCN interest packets requesting a content object that are received and where the originating user equipment or destination for the CCN response is designated for cache efficiency monitoring. The CCN gateway forwards this CCN interest packet with the cache check TLV having an initial value (e.g., an initial value of zero) toward a content server for the content object. At each CCN router along the path to the content server, the CCN router increments the cache check TLV before checking for the availability of the content object and, if the content object is not available, forwarding the CCN interest packet toward the content server. When a CCN router is found that can return the content object then the cache check TLV is included in the CCN response with the content object. When the CCN response and content object reach the initial CCN gateway, the CCN gateway can record the cache check TLV value in a cache monitoring database. The collected metrics for retrieving content objects in the CCN network stored in this cache monitoring database can be analyzed to determine how efficiently content objects are being stored in the CCN network.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Information Centric Networks

FIG. 1 is a diagram of one example of an architecture of a content centric networking (CCN) network. The CCN network in this example is an access network 101. The access network 101 is in communication with a set of separately administered networks including a home/enterprise network, the Internet and an LTE/3G mobile network.

The example shows that the access network can be further in communication with any number of additional CCN networks, IP networks or other types of networks. In this example, the CCN network implements the cache monitoring processes described further herein below and is provided by way of example and not limitation. A CCN network can be utilized in other contexts such as home networks, enterprise networks, or similar independently administered public or private networks.

The access network 101 can have any number of nodes and can utilize any combination of layer 1 and layer 2 protocols for communication between the CCN nodes of the access network 101. For sake of clarity, the nodes implementing the cache monitoring system are shown and described. The CCN nodes may be network devices (ND), as discussed further herein below. In some embodiments, the cache monitoring system is implemented in computing devices (e.g., computing devices executing a plurality of virtual machines for implementing network function virtualization (NFV)) and/or control plane devices (e.g., control plane devices configured to implement a control plane of a software defined networking (SDN) network). The CCN nodes of the access network 101 include a set of CCN routers 117 and CCN gateways (GW) 103. The CCN routers 117 manage CCN interest packets, forwarding these packets toward the corresponding content server 113 and managing the content response messages by forwarding them toward the requesting user equipment 105A-C.

The CCN nodes that communicate with the user equipment 105A-C in the separately administered networks are the CCN gateways 103. The user equipment 105A-C can be any type of user device including mobile devices, laptop computers, desktop computers, console devices, workstations and similar computing devices. In some embodiments, the CCN gateways 103 identify users of the user equipment 105A-C and apply the cache checking processes to specific users and/or specific user equipment, adding the cache check TLV only to those CCN interest packets originating from a designated set of users or user equipment and adding the returned cache check TLV values in CCN responses from content servers 113 destined for these users or user equipment 105A-C.

The content server 113 can be any computing device in communication with the access network 101. The access network 101 can be in communication with any number and variety of content servers 113. The content server 113 can be a server or similar computing device that hosts a set of services and resources such as data stores including web pages, audio/visual content, documents and similar static and/or dynamically generated data.

Figure 2:
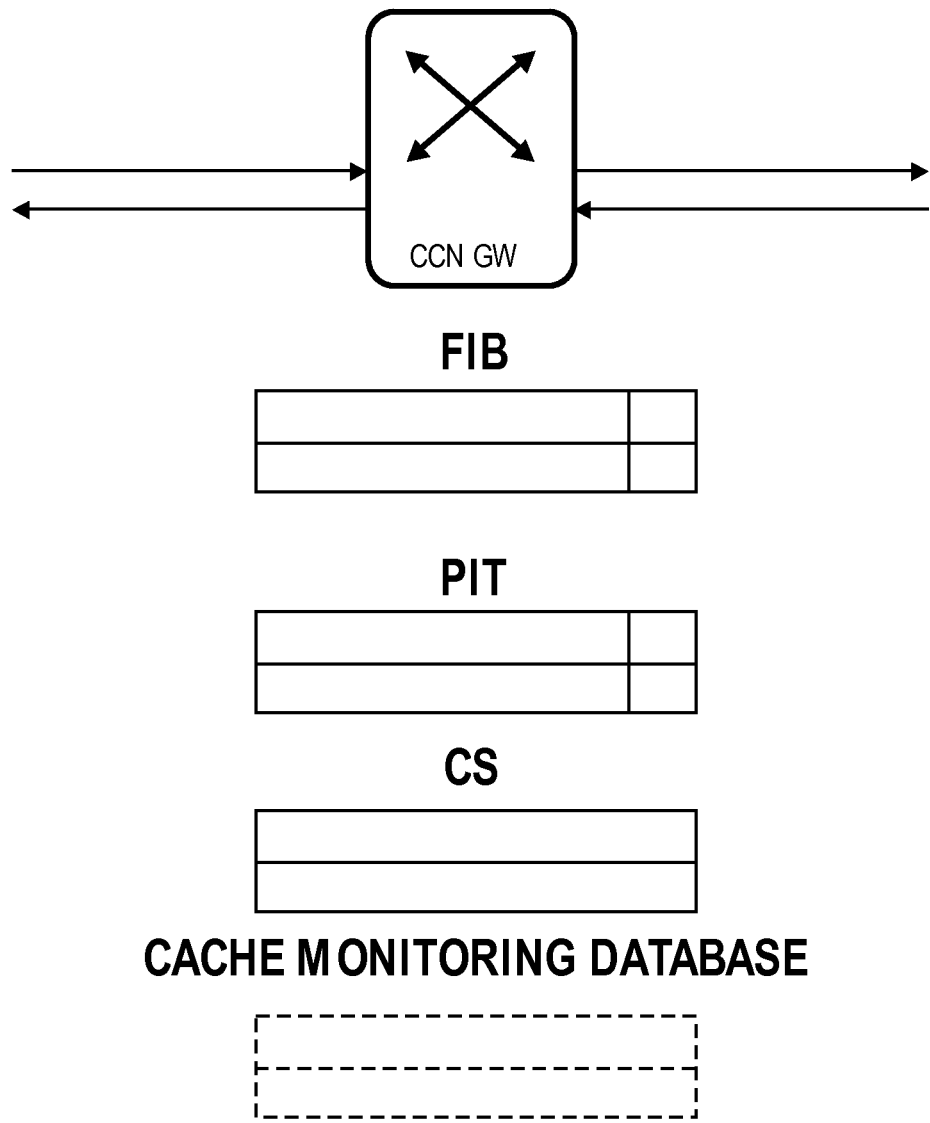
FIG. 2 is a diagram of one embodiment of an example set of data structures maintained by a CCN gateway node.

FIG. 2 is a diagram of one embodiment of the set of data structures maintained by CCN nodes. The CCN nodes such as CCN routers and CCN gateways maintain three or four sets of tables for tracking information related to CCN. In prior systems, only three tables were typically maintained. The existing CCN tables include the forwarding information base (FIB), the pending interest table (PIT) and the content store (CS). In some embodiments, a fourth data structure in the form of a cache monitoring database is present. The FIB is equivalent to the routing table in IP, where destination addresses and networks for particular content objects identified by content object names are matched with an output interface. In CCN, the IP prefixes utilized for matching on the routing table are replaced with prefixes of the content object names.

The PIT stores the CCN interest packets that have been received at an ingress port of the CCN node, but that have not been responded to yet. The entries of these CCN interest packets are referred to as 'pending interests' and are removed from the PIT when a corresponding content object is sent toward the originating user equipment that generated the CCN interest packet that was received via the associated ingress port or when the pending interest times out.

The CS is an optional local cache of content objects. This cache is optional and can have any size or store any number of content objects. CCN nodes can choose not to cache anything (for example in a core network where cache size would need to be huge in order to maximize cache hits). In one embodiment, the CS stores a set of recently received content objects.

In one embodiment, an additional data structure is maintained by a CCN node. The additional structure is a cache monitoring database. The cache monitoring database stores the cache check TLV values in database entries along with the content object name of an associated content object and destination or user identifier. The cache monitoring database can store any number of entries for each of the CCN responses wherein a cache check TLV is present. In some embodiments, a single cache check value is stored per content object and destination, while in other embodiments any number of database entries and cache check values can be stored for each content object and destination pair enabling more detailed analysis. In further embodiments, additional information including timestamps and similar meta data can be stored for each data entry. This additional data can further provide information relevant for analysis of caching efficiency in the CCN network.

Each CCN node also provides a set of network interfaces also referred to as "faces" over which CCN interest packets are received and forwarded and similarly over which CCN response packets are received and forwarded. In the example illustration, the CCN node includes three network interfaces, which are faces 1, 2, and 3. These network interfaces can represent a physical link or a Layer 2 interface. The network interfaces can also represent, in some embodiments, a transport protocol such as TCP/IP (in overlay mode) or even an application.

The basic data traffic forwarding in CCN is typically performed as explained below with an example sequence:

1. A CCN interest packet arrives through a face (network interface).
2. The CCN node checks whether it has the requested content object stored in its CS.
3. If the content object is found in the CS, then go to step 7.
4. If the content object is not found in the CS, then a check is made whether the same content has already been requested, by looking for a PIT entry that matches the content object name.
5. If a matching PIT entry is found, then update the matching PIT entry by adding the network interface through which the CCN interest was received. In this case, the process then exits.
6. If no matching PIT entry is found, then a new entry is created in the PIT for the content object name, and the CCN interest is forwarded toward the content server according to content object name prefix matching using the FIB.
7. When a content object arrives through a network interface in a CCN response packet, then forward the CCN response packet to each of the network interfaces listed in the related PIT entry. If the content object was found in the content store, then forward it to the network interface over which the corresponding CCN interest packet was received.

In the IP networks of the prior art, the IP networks are structured such that a single IP node that can be referred to as a packet gateway performs the role of gateway to the IP network, such as an access or operator network. In these architectures, all the data traffic will go through this packet gateway. For instance, in mobile networks, as mentioned above, there is always a serving gateway and PDN gateway (also known as EPG, Evolved Packet Gateway) that are the only entry/exit points of the access network to other networks such as the Internet. This creates a single point for various types of policy enforcement, but at the same time, this is a bottleneck for the network.

Figure 3A:
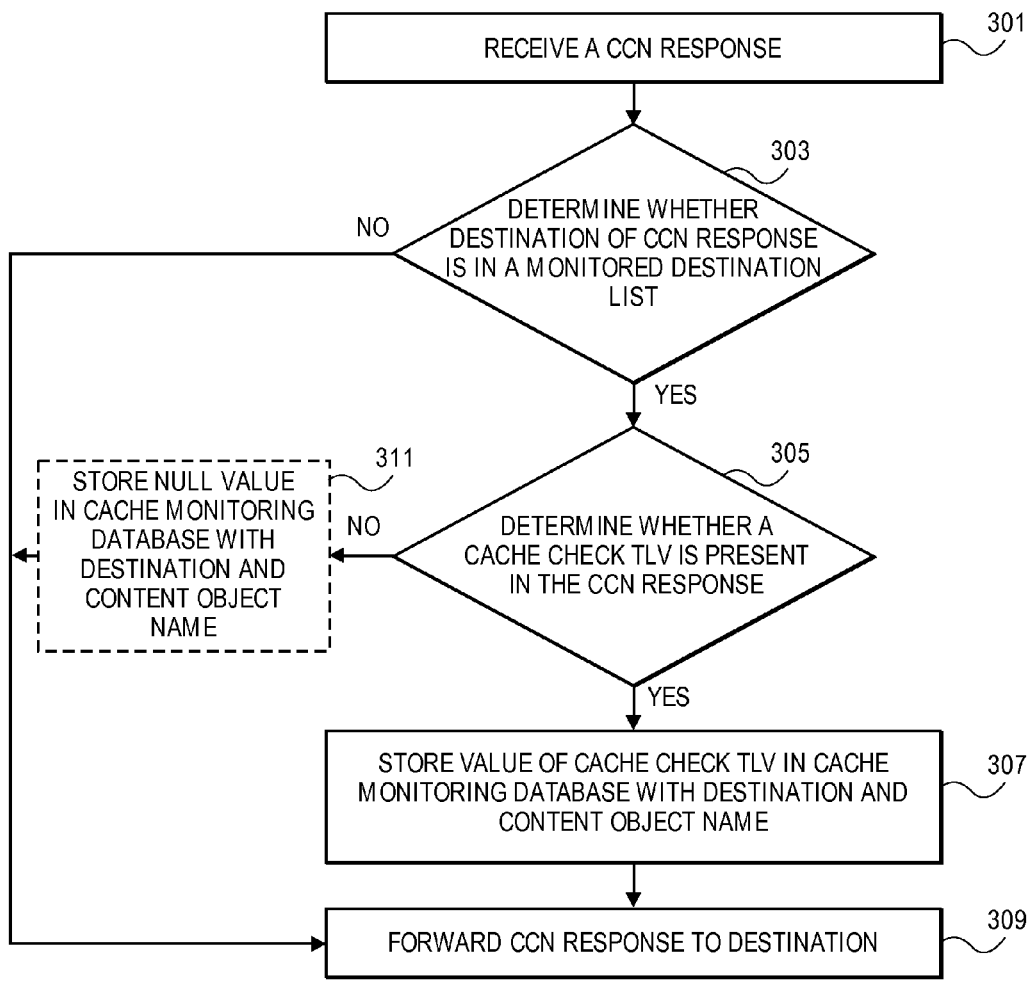
FIG. 3A is a flowchart of one embodiment of a process for a CCN router to update a cache monitoring database at the CCN gateway.

FIG. 3A is a flowchart of one embodiment of a process for processing a CCN response. This process is implemented by the cache monitoring module that is executed by a CCN gateway. The process is initiated in response to receiving a CCN response from another node such as a CCN router (Block 301). The CCN response includes a content object as well as a content object name for the content object. A destination for the CCN response can be determined at the CCN gateway through the user/user equipment authentication process. A determination is made whether the CCN response includes a destination that is in a monitored destination list (Block 303). If it is determined that the CCN response does not include a destination that is in the monitored destination list (NO branch of Block 303), then the process continues to process the CCN response in the same manner as a standard CCN response is handled including caching the content object and forwarding the CCN response (Block 309) toward the destination user equipment or user. Destinations can be user specific or user equipment specific. The destination can be the address, a uniform resource identifier or any similar identifier of the destination that is maintained by the CCN gateway that receives the CCN interest that ultimately results in the CCN response being generated. Neither the CCN interest nor the CCN response explicitly carry the destination information.

If it is determined that the CCN response includes a destination that is in the monitored destination list (YES branch of Block 303), then the process determines whether a cache check TLV is present in the CCN response (Block 305). If it is determined that a cache check TLV is not present in the CCN response (NO branch of Block 305), then the process may store a null distance value in the cache monitoring database in an entry with the destination and content object name (Block 311). The CCN response does not include any explicit information to be added to a cache monitoring database. However, inserting this null distance value can be used to identify scenarios where the content object is received in the CCN response from outside of the caching range such as from a content server or other source outside of the CCN network. The process continues by proceeding to forward the CCN response (Block 309) toward the destination user equipment or user. A copy of the content object may also be added to the content store of the network device implementing the process.

Where the CCN response includes a destination on the monitored destination list (YES branch of Block 303) and it is determined that a cache check TLV is present in the CCN response (YES branch of Block 305), then the process stores the value of the cache check TLV in the cache monitoring database in a database entry with the destination and content object name in the CCN response and any other data relevant to the cache efficiency analysis (Block 307). After the cache check value storage is performed then the process proceeds to forward the CCN response (Block 309) toward the destination user equipment or user.

Figure 3B:
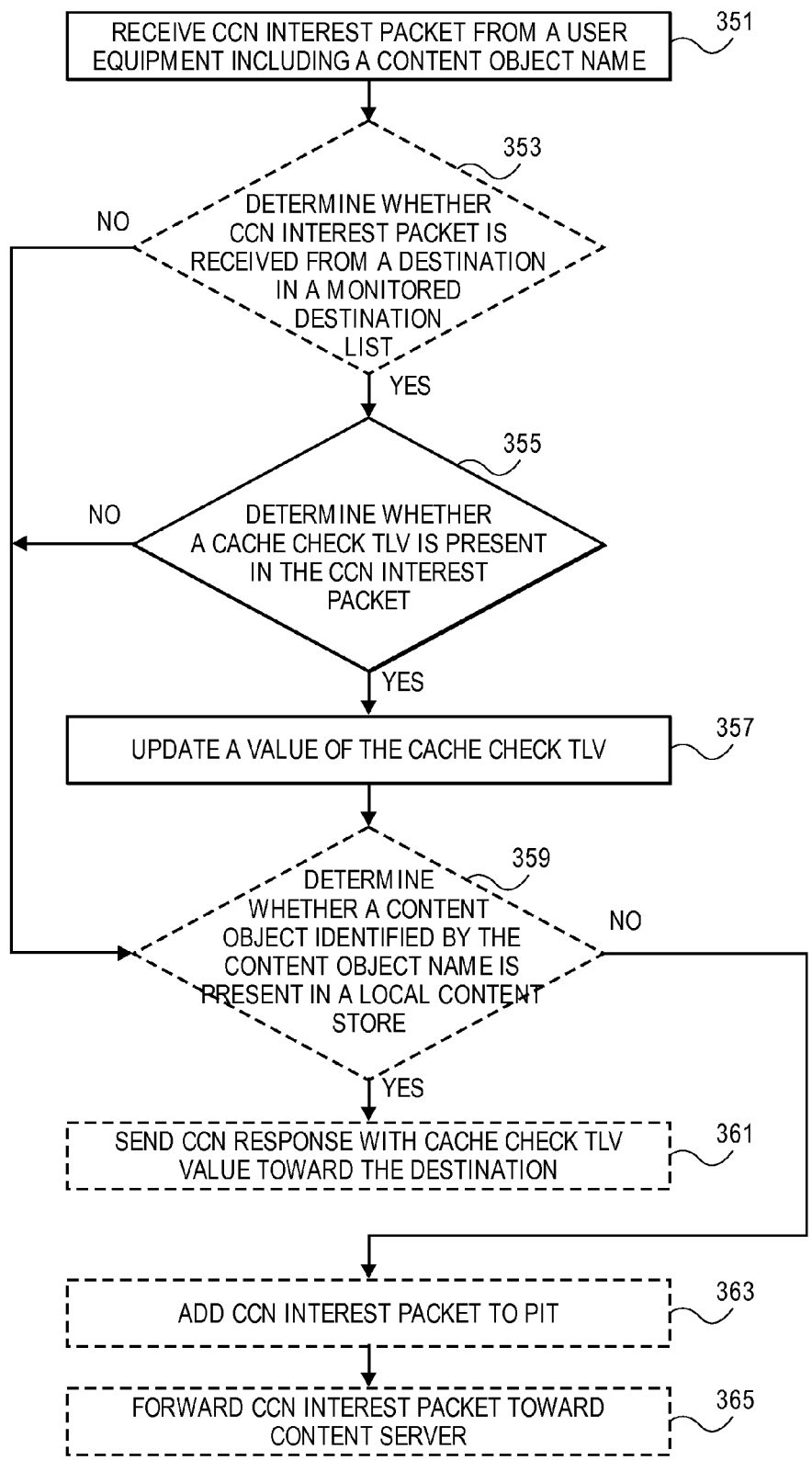
FIG. 3B is a flowchart of one embodiment of a process for updating a cache check TLV by a CCN node.

FIG. 3B is a flowchart of one embodiment of a process for network devices processing CCN interest packets to support the cache monitoring functions where the network devices can function as either CCN gateways or CCN routers. The process is initiated when a CCN interest packet is received, where the CCN interest packet includes a content object name (Block 351). The CCN interest packet can also include a cache check TLV indicating a number of hops that the CCN interest packet has made. The CCN interest packet is received by a CCN gateway from the user equipment or at a CCN router from another CCN router or the CCN gateway. A check may be performed to determine whether the CCN interest packet is received from a destination (i.e., destination for a resulting CCN response, which is the originating user or user equipment) in a monitored destination list (Block 353). In some embodiments or where the process is implemented away from a CCN gateway, the process may not include a check of the destination address. If the CCN interest packet does not include a destination in the monitored destination list (NO branch of Block 353), then the process proceeds with determining whether the content object is present (i.e., cached) in the local content store based on the content object name (Block 359). If it is determined that the content object is present in the local content store (YES branch of Block 359), then the content object can be returned in a CCN response including a cache check TLV with a cache check TLV value from the CCN interest packet (Block 361) if a cache check TLV was present in the CCN interest packet. The CCN response is sent to the destination identified in the CCN interest packet.

If the CCN interest packet includes a destination that is in the monitored destination list (YES branch of Block 353), then a determination is made whether a cache check TLV is present in the CCN interest packet (Block 355). If it is determined that the cache check TLV is not present (NO branch of Block 355), then the process proceeds with determining whether the content object is present (i.e., cached) in the local content store based on the content object name (Block 359). If it is determined that the content object is present in the local content store (YES branch of Block 359), then the content object can be returned in a CCN response including a cache check TLV (Block 361), however a cache check TLV value from the CCN interest packet will not be included with the CCN response in this scenario since the received CCN interest packet did not include one (NO branch of Block 355). The CCN response is sent to the destination identified in the CCN interest packet.

If the received CCN interest packet includes a destination in the monitored destination list (YES branch of Block 353) and it is determined that a cache check TLV is present in the CCN interest packet (YES branch of Block 355), then a value of the cache check TLV is updated to increase the number of hops that have been traversed for the CCN interest packet to have found the requested content object (Block 357). The process then proceeds with determining whether the content object is present (i.e., cached) in the local content store based on the content object name (Block 359). If it is determined that the content object is present in the local content store (YES branch of Block 359), then the content object can be returned in a CCN response including a cache check TLV with the updated cache check TLV value from the CCN interest packet (Block 361).

In all cases where a content object is absent from (i.e., not present in) the local content store (NO branch of Block 359), then the content object must be retrieved from the content server or another node in the route to the content server. To retrieve the content object, the CCN interest packet is added to the PIT as an entry (Block 363) and the CCN interest packet is then forwarded toward the content server that hosts the requested content object (Block 365).

Figure 4A:
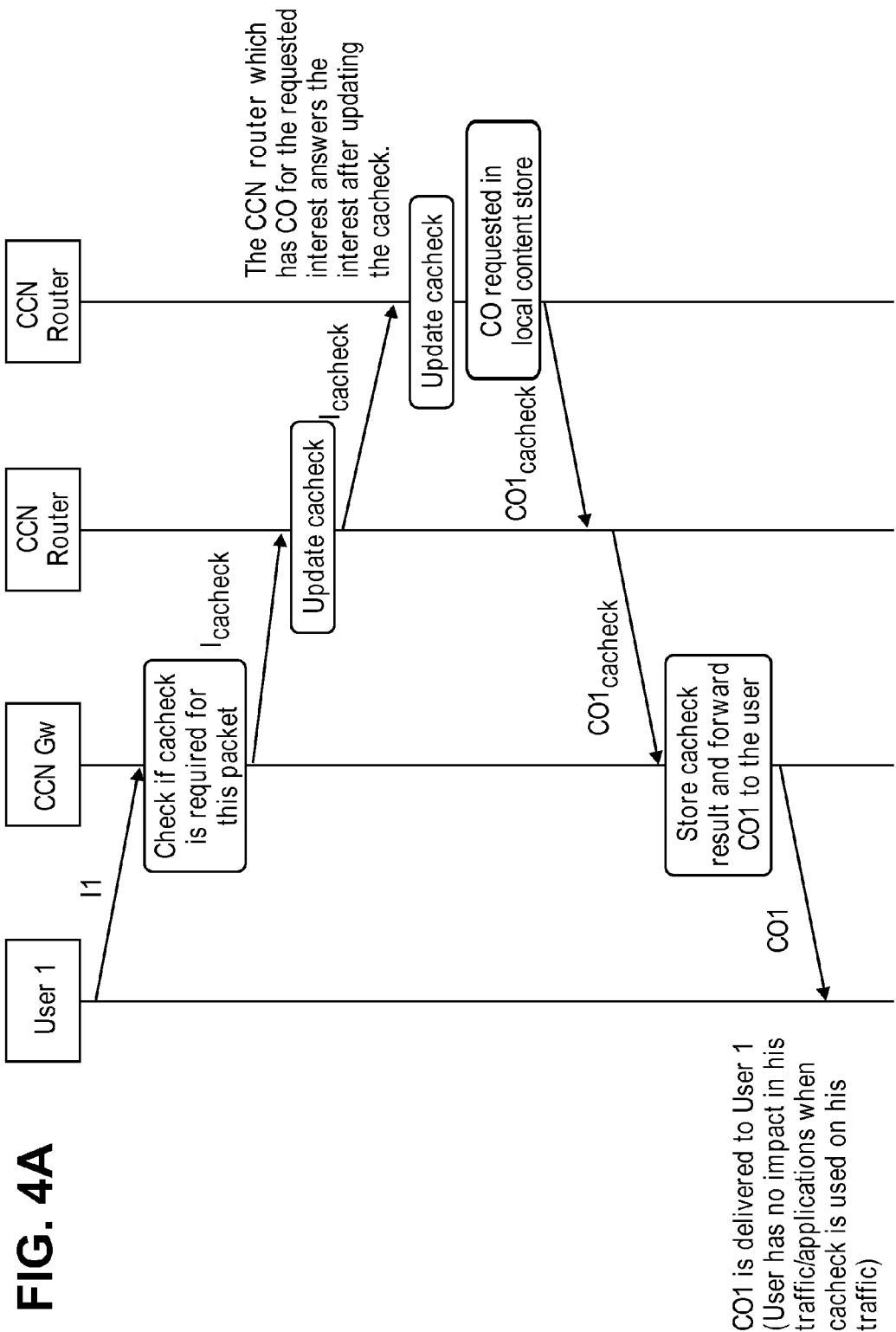
FIG. 4A is a timing diagram of one embodiment of a process for a CCN router to update a cache monitoring database at the CCN gateway.

FIG. 4A is a timing diagram of the handling of CCN interest packets in the CCN network. In this embodiment, the user via user equipment initiates a request for a content object by sending a CCN interest packet (I1) to the CCN gateway. At the CCN gateway, the CCN interest packet (I1) is processed as described above in regard to FIG. 3B. In particular, the CCN interest packet (I1) is checked to determine whether the requesting user is in a monitored destination list or similarly identifies those CCN interest packets to monitor. Where the CCN interest packet is to be monitored, a cache check TLV is added to the CCN interest packet (I1cacheck) and it is forwarded further into the CCN network toward a content server for the content object that was identified by the CCN interest packet assuming that this content object was not cached in a local content store of the CCN gateway.

At each CCN router traversed by the CCN interest packet (I1cacheck), the CCN router updates the cache check TLV value until the CCN interest packet (I1cacheck) reaches a CCN router that stores the requested content object (e.g., in a local content store). If no CCN router in the CCN network along the route to the content server is caching the content object then the caching tracking fails, because the CCN interest will reach another CCN gateway and exit the CCN network, in which case the cache check TLV and its value is lost. At each hop, the cache check TLV can be incremented by any value. The value can be incremented with a fixed value, for example, increasing the value by one at each hop. In other embodiments, the amount of increase can vary for any reason such as differing types of links or differing types of CCN routers that are traversed. At the CCN router that stores the requested content object, a CCN response is generated to carry the requested content object, and in this CCN response, the cache check TLV is copied so that the cache check TLV value at the time of reaching the CCN router storing the requested content object is returned. This gives the initiating CCN gateway information about the distance that the CCN interest packet had to traverse to obtain the content object and thereby provides information about the efficiency of caching in the CCN network.

The CCN response (CO1cacheck) with the requested content object and the cache check TLV is returned along the same route traversed by the CCN interest packet. When the CCN response (CO1cacheck) reaches the CCN gateway, the cache check TLV value can be stored in the cache monitoring database and the content object can be returned to the user or user equipment. Thus, cache efficiency related data can be compiled at the CCN gateways without having a significant impact on the retrieval of content objects for users and user equipment.

Figure 4B:
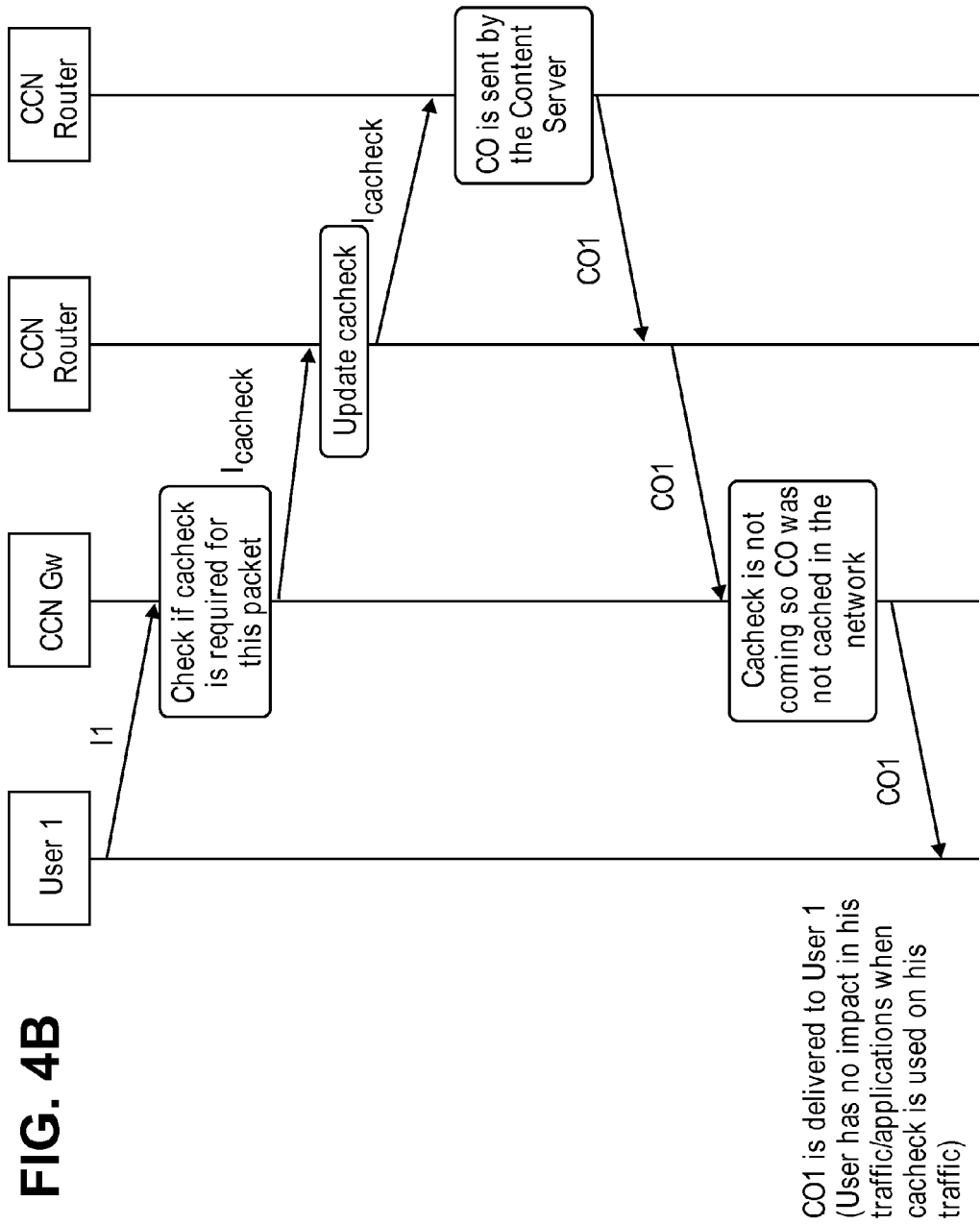
FIG. 4B is a timing diagram one embodiment of a process for updating a cache check TLV by a CCN node.

FIG. 4B is a timing diagram of another embodiment of a process illustrating the handling of a case where the content object is not cached in the CCN network. In this case, the CCN interest packet (I1) including the content object name of a requested content object is generated and sent by a user and/or user equipment to the CCN gateway. The CCN interest packet (I1) is processed as described above in regard to FIG. 3B with the cache check TLV added to the CCN interest packet (I1cacheck) where the user or user equipment is listed in the monitored destination list. The CCN interest packet (I1cacheck) is forwarded on toward the content server with each intermediate CCN router incrementing the cache check TLV value. However, when the CCN interest packet (I1cacheck) is forwarded to the content server and processed by the content server, then the cache check TLV is lost due to the content server not being configured to support the processing of the cache check TLV. Thus, when the content server returns a CCN response (CO1), it will not contain the cache check TLV and the cache monitoring database will not be updated at the CCN gateway. In other embodiments, a content server can be configured to support the cache efficiency monitoring by identifying the cache check TLV in the received CCN interest packet (I1cacheck) and returning the cache check TLV in the CCN response, similar to CO1cacheck discussed above with reference to FIG. 4A.

Architecture

Figure 5:
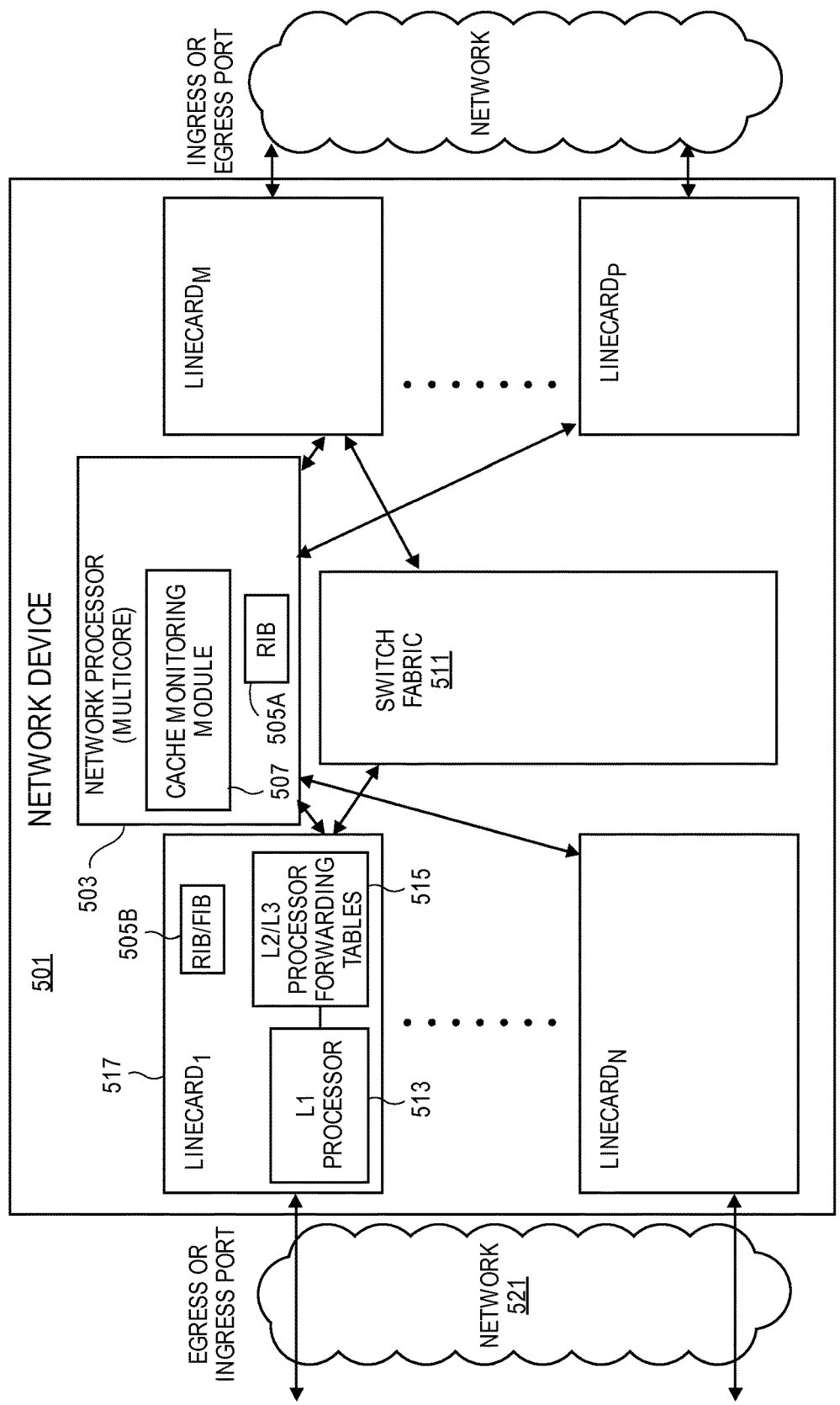
FIG. 5 is a diagram of one embodiment of a network device (ND) implementing a process for cache efficiency monitoring.

FIG. 5 is a diagram of one embodiment of a network device implementing the cache efficiency monitoring process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the cache efficiency monitoring process is implemented by a network device 501 or similar computing device. The network device 501 can have any structure that enables it to receive data traffic and forward it toward its destination. The network device 501 can include a network processor 503 or set of network processors that execute the functions of the network device 501. A 'set,' as used herein, is any positive whole number of items including one item. The network device 501 can execute a cache monitoring module 507 to implement the functions of identifying a CCN interest packet in which to insert or update a cache check TLV value and the function of identifying CCN responses with the cache check TLV to update the cache monitoring database (not illustrated) where the network device 501 functions as a CCN gateway or CCN router as described herein above via a network processor 503.

The network device 501 connects with separately administered networks that have user equipment and/or content servers. The network processor 503 can implement the cache monitoring module 507 as a discrete hardware, software module or any combination thereof. The network processor 503 can also service the routing information base 505A and similar functions related to data traffic forwarding and network topology maintenance. The routing information base 505A can be implemented as match action tables that are utilized for forwarding protocol data units PDUs (i.e., packets). The functions of the cache monitoring module 507 can be implemented as modules in any combination of software, including firmware, and hardware within the network device. The functions of the cache monitoring module 507 that are executed and implemented by the network device 501 include those described further herein above. In some embodiments a cache monitoring database is maintained or interacted with by the cache monitoring module 507. However, the cache monitoring database can be any type of data structure that is either maintained internal or external to the network device 501.

In one embodiment, the network device 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the forwarding information base 505B, or a relevant subset thereof. The line cards 517 can also implement or facilitate the cache monitoring module 507 functions described herein above. The line cards 517 are in communication with one another via a switch fabric 511 and communicate with other nodes over attached networks 521 using Ethernet, fiber optic or similar communication links and media.

The operations of the flow diagrams have been described with reference to the exemplary embodiment of the block diagrams. However, it should be understood that the operations of the flowcharts could be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 501 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated circuits (ASICs) and a proprietary operating system (OS); and 2) a general-purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In some embodiments, the control communication and configuration module 632A encompasses the cache monitoring module 633A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) (i.e., implemented as match action tables) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) are to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 816 based on the forwarding table(s) 634A-R.

FIG. 6B illustrates an exemplary way to implement the special-purpose network device 602 according to some embodiments of the invention. FIG. 6B shows a special-purpose network device including cards 838 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In some embodiments, the virtual machine module 662A encompasses cache monitoring module 664A.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service— e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content server or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP) (RSVP-Traffic Engineering (TE): Extensions to RSVP for LSP Tunnels, Generalized Multi-Protocol Label Switching (GMPLS) Signaling RSVP-TE) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R that are implementations of match action tables (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach). In some embodiments, the centralized reachability and forwarding module 679 encompasses cache monitoring and efficiency functions in cache monitoring module 681 as described herein above.

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The application layer 686 thus enables the execution of applications that manage or interact with the functions associated with the network elements.

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
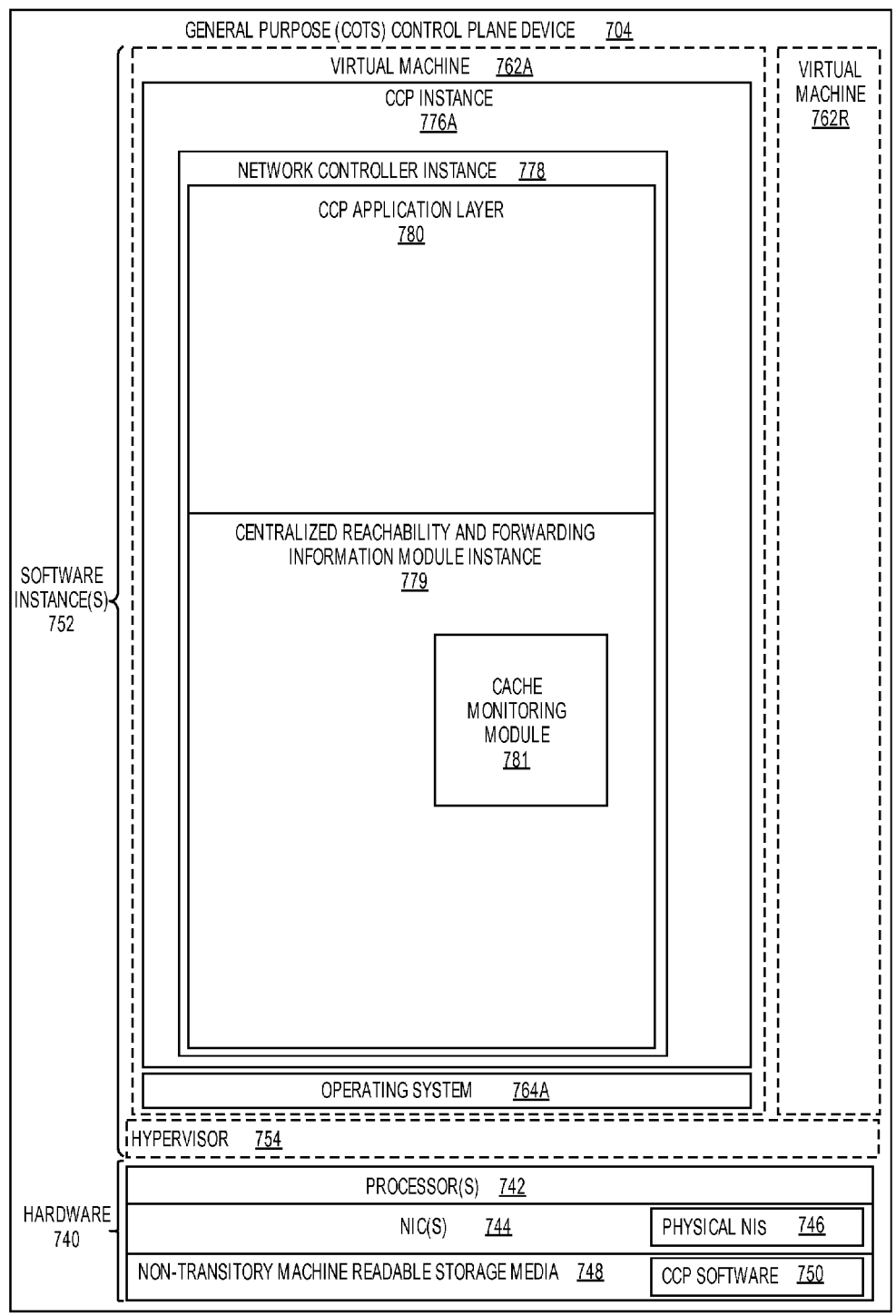
FIG. 7 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 778 to the operating system 764A and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 776 works with virtual network view(s) (logical view(s) of the network) and the middleware layer provides the conversion from the virtual networks to the physical view. The CCP application can encompass the functionality of the cache monitoring module 781 as described herein above.

The centralized control plane 776 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for monitoring cache efficiency by a network device implementing a content centric networking (CCN) gateway or CCN router, where the CCN gateway or CCN router is part of a CCN network, the method to collect content object retrieval information using a cache check type length value (TLV) that tracks a number of hops between a CCN gateway and a node in the CCN network that caches the content object, the method comprising:
   receiving a CCN interest packet from a user equipment, the CCN interest packet including a content object name;
   determining whether the cache check TLV is present in the CCN interest packet; and
   updating a value of the cache check TLV where the cache check TLV is determined to be present in the CCN interest packet.

2. The method of claim 1, the method further comprising:
   determining whether a content object identified by the content object name is present in a local content store; and
   sending a CCN response with the updated cache check TLV value toward a destination, in response to the content object being determined to be present in the local content store.

3. The method of claim 1, method further comprising:
   adding the CCN interest packet to a pending interest table; and
   forwarding the CCN interest packet toward a content server, when the content object is absent from a local content store.

4. The method of claim 1, the method further comprising:
   receiving a CCN response; and
   determining whether the CCN response includes a destination that is in a monitored destination list.

5. The method of claim 4, further comprising the step of:
   determining whether a cache check TLV is present in the CCN response; and
   storing a value of the cache check TLV determined to be present in the CCN response in a cache monitoring database.

6. The method of claim 5, wherein the value of the cache check TLV determined to be present in the CCN response is stored in a cache monitoring database entry with the destination and content object name.

7. A network device to implement a method for monitoring cache efficiency by a network device implementing a content centric networking (CCN) gateway or CCN router, where the network device functions as a CCN gateway or CCN router that is part of a CCN network, the method to collect content object retrieval information using a cache check type length value (TLV) that tracks a number of hops between a CCN gateway and a node in the CCN network that caches the content object, the network device comprising:
   a non-transitory computer-readable medium having stored therein a cache monitoring module; and
   a processor coupled to the non-transitory computer-readable medium, the processor configured to execute the cache monitoring module, the cache monitoring module configured to access a CCN interest packet received from a user equipment, the CCN interest packet including a content object name, to determine whether the cache check TLV is present in the CCN interest packet, and to update a value of the cache check TLV where the cache check TLV is determined to be present in the CCN interest packet.

8. The network device of claim 7, wherein the cache monitoring module is further configured to determine whether a content object identified by the content object name is present in a local content store, and to provide a CCN response with the updated cache check TLV value to be sent toward a destination, in response to the content object being determined to be present in the local content store.

9. The network device of claim 7, wherein the cache monitoring module is further configured to add the CCN interest packet to a pending interest table, and to provide the CCN interest packet to be forwarded toward a content server, when the content object is absent from a local content store.

10. The network device of claim 7, wherein the cache monitoring module is further configured to access a received CCN response, and to determine whether the CCN response includes a destination that is in a monitored destination list.

11. The network device of claim 10, wherein the cache monitoring module is further configured to determine whether a cache check TLV is present in the CCN response, and to store a value of the cache check TLV determined to be present in the CCN response in a cache monitoring database.

12. The network device of claim 11, wherein the value of the cache check TLV determined to be present in the CCN response is stored in a cache monitoring database entry with the destination and content object name.

13. A computing device to execute a plurality of virtual machines for implementing network function virtualization (NFV), wherein a virtual machine from the plurality of virtual machines is configured to implement a method for monitoring cache efficiency by the computing device implementing a content centric networking (CCN) gateway or CCN router, where the CCN gateway or CCN router is part of a CCN network, the method to collect content object retrieval information using a cache check type length value (TLV) that tracks a number of hops between a CCN gateway and a node in the CCN network that caches the content object, the computing device comprising:
 a non-transitory computer-readable medium having stored therein a cache monitoring module; and
 a processor coupled to the non-transitory computer-readable medium, the processor configured to execute the virtual machine, the virtual machine configured to execute the cache monitoring module, the cache monitoring module configured to access a CCN interest packet received from a user equipment, the CCN interest packet including a content object name, to determine whether a cache check TLV is present in the CCN interest packet, and to update a value of the cache check TLV where the cache check TLV is determined to be present in the CCN interest packet.

14. The computing device of claim 13, wherein the cache monitoring module is further configured to determine whether a content object identified by the content object name is present in a local content store, and to provide a CCN response with the updated cache check TLV value to be sent toward a destination, when the content object is determined to be present in the local content store.

15. The computing device of claim 13, wherein the cache monitoring module is further configured to add the CCN interest packet to a pending interest table, and to provide the CCN interest packet to be forwarded toward a content server, when the content object is absent from a local content store.

16. The computing device of claim 13, wherein the cache monitoring module is further configured to access a received CCN response, and to determine whether the CCN response includes a destination that is in a monitored destination list.

17. The computing device of claim 16, wherein the cache monitoring module is further configured to determine whether a cache check TLV is present in the CCN response, and to store a value of the cache check TLV determined to be present in the CCN response in a cache monitoring database.

18. The computing device of claim 17, wherein the value of the cache check TLV determined to be present in the CCN response is stored in a cache monitoring database entry with the destination and content object name.

19. A control plane device configured to implement a control plane of a software defined networking (SDN) network including a plurality of network devices forming a content centric networking (CCN) network, the control plane device implementing a method for monitoring cache efficiency, the method to collect content object retrieval information using a cache check type length value (TLV) that tracks a number of hops between a CCN gateway and a node in the CCN network that caches the content object, the control plane device comprising:
 a non-transitory computer-readable medium having stored therein a cache monitoring module; and
 a processor coupled to the non-transitory computer-readable medium, the processor configured to execute the cache monitoring module, the cache monitoring module configured to access a CCN interest packet received from a user equipment, the CCN interest packet including a content object name, to determine whether a cache check TLV is present in the CCN interest packet, and to update a value of the cache check TLV where the cache check TLV is determined to be present in the CCN interest packet.

20. The control plane device of claim 19, wherein the cache monitoring module is further configured to determine whether a content object identified by the content object name is present in a local content store, and to provide a CCN response with the updated cache check TLV value to be sent toward a destination, when the content object is determined to be present in the local content store.

21. The control plane device of claim 19, wherein the cache monitoring module is further configured to add the CCN interest packet to a pending interest table, and to provide the CCN interest packet to be forwarded toward a content server, when the content object is absent from a local content store.

22. The control plane device of claim 19, wherein the cache monitoring module is further configured to access a received CCN response, and to determine whether the CCN response includes a destination that is in a monitored destination list.

23. The control plane device of claim 22, wherein the cache monitoring module is further configured to determine whether a cache check TLV is present in the CCN response, and to store a value of the cache check TLV determined to be present in the CCN response in a cache monitoring database.

24. The control plane device of claim 23, wherein the value of the cache check TLV determined to be present in the CCN response is stored in a cache monitoring database entry with the destination and content object name.

\* \* \* \* \*